United States Patent [19]

Ross et al.

[11] 3,733,529

[45] May 15, 1973

[54] PLURAL MOTOR TAPE DRIVE SPEED CONTROL

[75] Inventors: Edward A. Ross, Wellesley, Mass.; Gerhard M. Baule, Syracuse, N.Y.

[73] Assignee: Ross Controls Corporation, Newton, Mass.

[22] Filed: May 22, 1972

[21] Appl. No.: 255,461

[52] U.S. Cl.....................................318/7, 242/75.44

[51] Int. Cl.................................................H02p 5/46

[58] Field of Search..............................318/6, 7, 571; 242/75.44

[56] References Cited

UNITED STATES PATENTS

| | | | |
|---|---|---|---|
| 2,837,705 | 6/1958 | Spuhler | 318/7 |
| 3,045,937 | 7/1962 | Johnson | 318/7 X |
| 3,156,397 | 11/1964 | Davies | 318/6 X |
| 3,218,529 | 11/1965 | Evans et al. | 318/7 |
| 3,444,445 | 5/1969 | Mullin | 318/7 |
| 3,644,806 | 2/1972 | Belson et al. | 318/7 |
| 2,927,735 | 3/1960 | Scuitto | 318/571 UX |

*Primary Examiner*—T. E. Lynch
*Attorney*—Herbert W. Kenway et al.

[57] ABSTRACT

Controls for winding a strip such as magnetic recording tape at a constant linear speed on to a take-up reel from a supply reel. The controls are responsive to the instantaneous angular speeds of both reels, maintaining at a substantially constant value the ratio of the product of the squares of the speeds to the sum of the squares, by varying the speed of the take-up reel while sufficiently restraining the supply reel to maintain tension on the strip.

13 Claims, 5 Drawing Figures

PLURAL MOTOR TAPE DRIVE SPEED CONTROL

BRIEF SUMMARY OF THE INVENTION

This invention relates generally to speed controls for reel winding devices, and more particularly to means for maintaining the linear speed of a strip constant as it is wound upon a take-up reel.

While the generality of applications for this kind of control will be recognized by those familiar with the several arts in which strips of various kinds of material are wound upon reels, drums, spools, textile beams and other means, the invention finds particular application as herein described for driving magnetic tape in so-called cassette type tape recorders. One problem, stated in its most general form, is that when a tape is fed from one reel to another, its linear speed cannot be held constant unless the angular velocity of the take-up reel continuously decreases while that of the supply reel continuously increases. Moreover, the angular velocities of the reels are non-linear functions of time.

Various schemes have been developed for achieving a substantially constant linear tape speed past the electromagnetic transducing head, such as capstan drives and prerecorded clock tracks on the tape. Both of these schemes have been proposed for use with cassettes which comprise housings that substantially enclose the tape. Capstan drives increase the cost and complexity of the tape transport apparatus and associated cassette structure. Prerecorded clock tracks require the use of special cassettes and use up a substantial part of the available width of the tape. These and other problems involved in using both schemes are particularly acute in digital cassette drives requiring relatively high tape speeds with fast and frequent stops, starts and reversals of direction.

It is a principal object of this invention to provide speed control for the tape by controlling the angular velocity of the take-up reel through a suitable variable speed drive.

Another and closely related object is to provide means for making the variable speed drive on the take-up reel responsive only to the angular velocities of the two reels.

Other objects of the invention include the provision of means to maintain a substantially constant tension on the tape throughout the time period required to fill the take-up reel, associated circuitry for stopping, winding and rewinding the tape, and means to provide adequate sensitivity and fast response to small variations in speed, so as to maintain the tape speed constant within a relatively small range of variation.

With the foregoing and other objects in view, this invention provides means responsive to the angular velocities of the take-up and supply reels, means for generating a function of at least one of said velocities, means for comparing said function with a second value, and means responsive to the values so compared to control the speed of the take-up reel. It is shown that the angular velocities of the take-up and supply reels are so related that a function may be produced which, by means of such comparison, results in maintaining a constant, predetermined linear velocity of the tape within a close tolerance by servomechanical action with the drive for the take-up reel in the feedback loop.

Apparatus embodying the foregoing elements may take various forms, and details of certain of the elements are in themselves well known in the art. For example, various means may be employed to sense the angular velocities of the reels. Various drive means for the reels may also be used, the form herein described comprising D.C. permanent magnet stator torque motors characterized by a proportional relationship between rotational speed and the induced counter E.M.F. in the armature. Other sensing means may be employed, such as means for generating a voltage by movement of parts turning in synchronism with the reel, the voltage being a function of the angular velocity. Generically, such speed sensing means associated with the respective reels will be referred to herein as tachometers.

The function generator and comparison means may take various forms, since the values compared are mathematically related to the function generated as hereinafter particularly described. In one embodiment the function compared is that of the outputs from both of the tachometers. In a second embodiment the function is that of only one of the tachometers. In a third embodiment the function is that of the difference between the outputs of the two tachometers.

The output of the comparison means controls the speed of the take-up reel, and in the described embodiment this is done by varying the current through the armature winding of a torque motor, in which the shaft torque is proportional to the armature current.

Other features of the invention will be understood in the context of the following description, having reference to the appended drawing.

DETAILED DESCRIPTION

Figure 1:
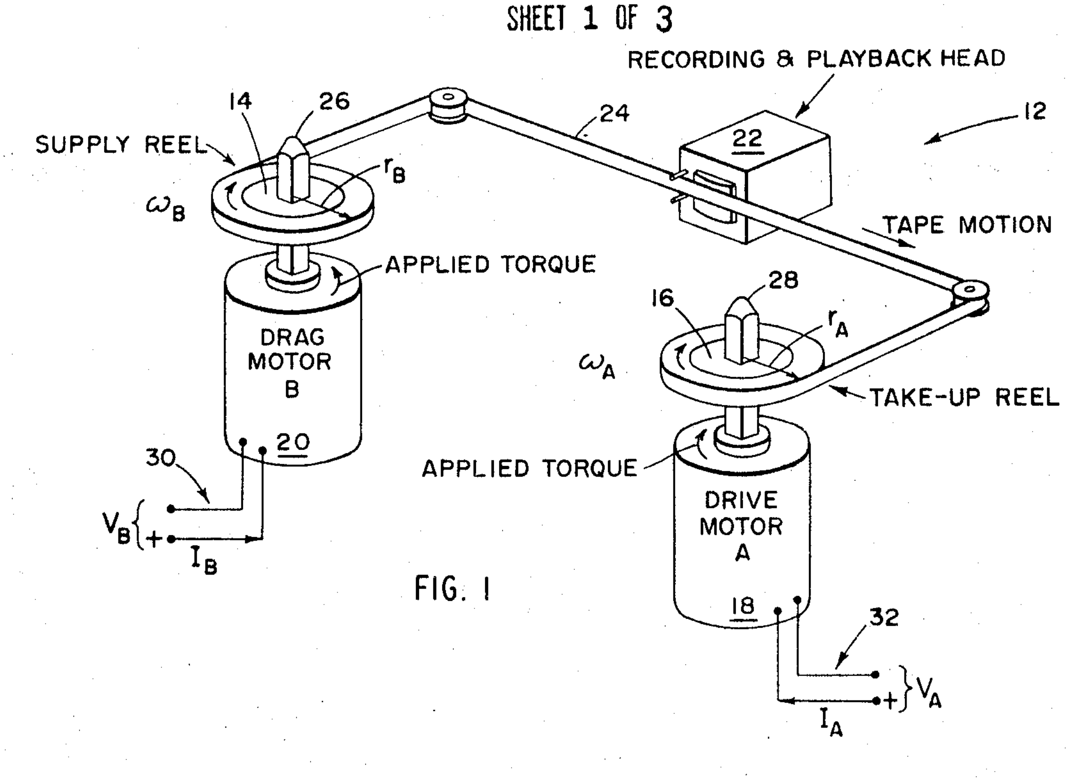
FIG. 1 is a pictorial view in perspective showing the principal components of a magnetic tape drive of the type for control by the present invention.

Referring to FIG. 1, the invention is described with reference to a magnetic tape drive designated generally at 12 and comprising a supply reel 14, a take-up reel 16, a drive motor 18, a drag motor 20 and a recording and playback head 22. A strip of plastic tape 24 coated with magnetic material is fed past the head 22 in the direction indicated by the arrow.

It will be understood that FIG. 1 is intended for illustrative purposes only and is not intended to be restrictive as to the precise arrangement and configuration of the several parts. Also, the drives for the respective reels may take any one of several known forms. In any case, a principal object is to achieve a constant, predetermined linear speed of the tape 24 as it moves past the head 22, by means operable solely as a function or functions of the angular or rotational velocities of the reels 14 and 16.

In this embodiment the reels 14 and 16 are secured to shafts 26 and 28 of the motors 20 and 18, respectively, and corresponding electrical circuit connections 30 and 32 to the armatures provide means for both sensing and controlling the motor speeds as hereinafter described.

The relationship of the angular velocities of the reels may be derived from the following considerations. Defining $\omega_A$ as the angular velocity of the take-up reel and $r_A$ as the momentary radius of the take-up reel which varies from $R_E$ when empty to $R_F$ when full, and also defining $\omega_B$ and $r_B$ in a like manner for the supply reel, we have the following general expression which recognizes the equality between the linear velocities of the tape at the periphery of both reels, assuming that the tape is under tension between the reels.

$$\omega_A r_A = \omega_B r_B \qquad (1)$$

Also, the following equation may be written to express the fact that the sum of the momentary quantities of tape on the two reels equals the quantity of tape on one of the reels when it is full.

$$\pi(r_A^2 - R_E^2) + \pi(r_B^2 - R_E^2) = \pi(R_F^2 - R_E^2) \qquad (2)$$

Equation (2) reduces to the following form.

$$r_A^2 + r_B^2 = R_E^2 + R_F^2 \qquad (3)$$

Defining $s$ as the linear speed of the tape, one may derive from the above equations algebraically the following expression.

$$(4) \qquad s = 2\pi\omega_A r_A = \frac{2\pi\omega_A\omega_B\sqrt{R_E^2 + R_F^2}}{\sqrt{\omega_A^2 + \omega_B^2}}$$

Defining $\alpha$ as follows:

$$(5) \qquad \alpha = \frac{s}{2\pi\sqrt{R_E^2 + R_F^2}}$$

equation (4) may be rewritten in the following form.

$$(6) \qquad \alpha = \frac{\omega_A\omega_B}{\sqrt{\omega_A^2 + \omega_B^2}} = e_{R1}$$

By transposing terms equation (6) may be rewritten in the following form.

$$(7) \qquad \omega_A = \frac{\alpha\omega_B}{\sqrt{\omega_B^2 - \alpha^2}} = e_{R2}$$

By defining $\omega_A - \omega_B$ as $\Delta$, equation (7) may be rewritten in the following form.

$$\omega_A = -(\Delta/2) + [(\Delta^2/4) + \alpha^2 + \alpha(\Delta^2 + \alpha^2)^{1/2}]_{1/2} = e_{R3}$$

From equations (5) and (6) it is evident that if the speed $s$ has a constant, predetermined value, there is a constant, predetermined value for $\alpha$, and the ratio of the product of the squares of the angular speeds to the sum of said squares is constant and equal to $\alpha^2$.

Figure 2:
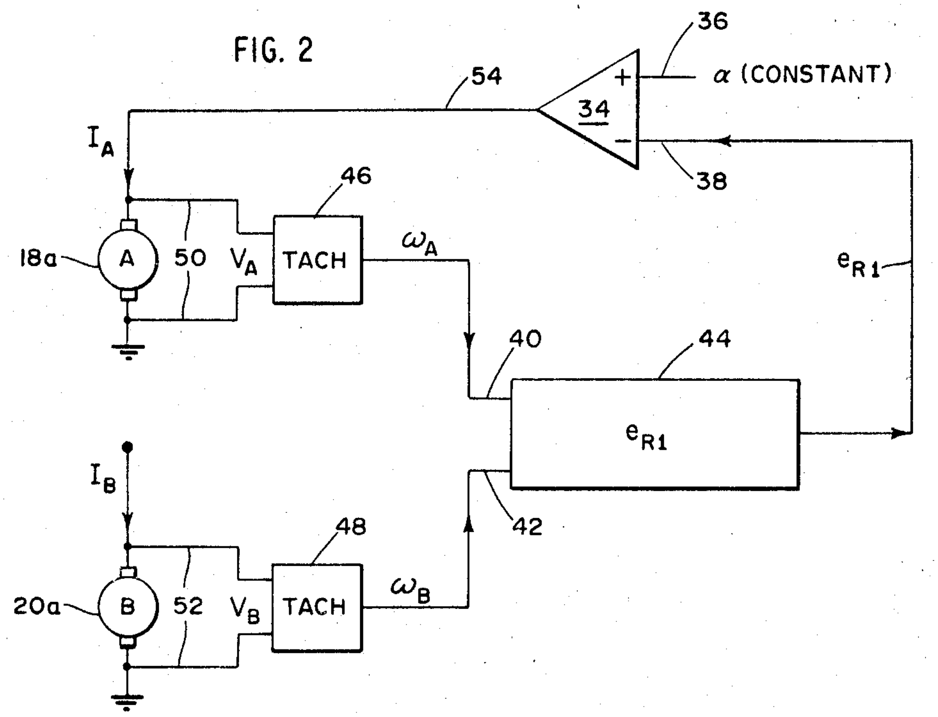
FIG. 2 is a block diagram illustrating a first embodiment of the invention.

FIG. 2 shows an embodiment of the invention based on equation (6), having comparison means 34 that compare a voltage at an input 36 proportional to $\alpha$ with a voltage at an input 38 proportional to the value $e_{R1}$. Voltages proportional in magnitude to the values $\omega_A$ and $\omega_B$ are applied at inputs 40 and 42, respectively, to a function generator 44 that produces the output voltage $e_{R1}$.

The angular velocities of the two reels are produced by tachometer circuits 46 and 48 which are responsive to voltages appearing across leads 50 and 52, respectively, connected across the armatures 18a and 20a of the drive motor 18 and drag motor 20, respectively. As stated above, each of these motors is a small D.C. torque motor with a permanent magnet stator. In motors of this type the induced counter E.M.F. in the armature is proportional to the motor's rotational speed. The voltages across the leads 50 and 52 are functions of the voltage drops due to the current passing through the armature resistance, as well as functions of the induced counter E.M.F. The tachometer circuits 48 and 50 are adapted to balance out the effect of the resistance drops, thereby producing outputs directly proportional to the values $\omega_A$ and $\omega_B$, as further explained below with reference to FIG. 5.

The output of the comparison means 34 appears on a lead 54 supplying current to the drive motor 18. The voltage on the lead 54 varies from a maximum value when the take-up reel is empty to a minimum value when it is full. The resulting variations in the rotational velocity of the drive motor produce corresponding variations in the voltage across the leads 50, thereby varying the voltage on the input lead 40 to the function generator 44. Corresponding variations in the rotational velocity $\omega_B$ are required in order that the function $e_{R1}$ shall remain constant. If at any moment the angular velocity $\omega_A$ is larger than the value it should have for the corresponding value $\omega_B$, the value $e_{R1}$ rises above the desired constant value $\alpha$, and the circuit 34 produces a corresponding decrease in the current passing through the lead 54 to the armature of the drive motor. In a corresponding manner, if the velocity $\omega_A$ is lower than the value it should have for the corresponding velocity $\omega_B$, the function $e_R$ decreases below the constant $\alpha$, and the comparison means 34 increases the current flowing through the lead 54 to the drive motor.

In motors of this type, the shaft torque is proportional to the current through the armature winding, and therefore corresponding increases and decreases are produced in the speed of the drive motor to maintain the voltage on the input lead 38 constant and equal to that on the input lead 36.

It will be seen from FIG. 2 that to adapt the tape drive for any other predetermined speed, it is only necessary to change the input voltage on the lead 36 to a corresponding value computed from equation (5).

Figure 3:
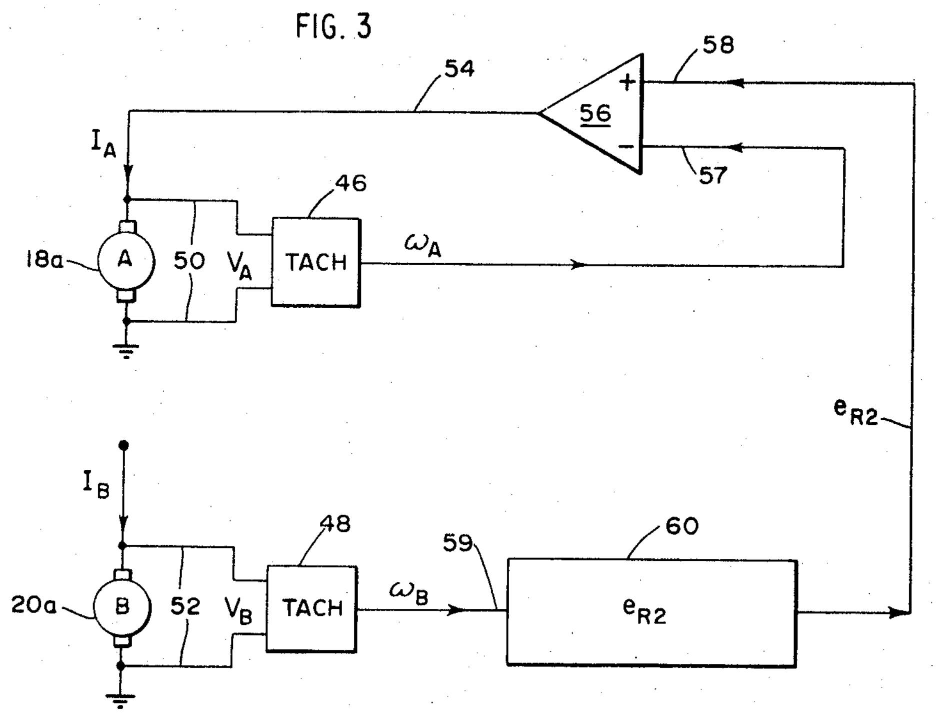
FIG. 3 is a block diagram illustrating a second embodiment of the invention.

FIG. 3 shows an embodiment of the invention based on equation (7), having comparison means 56 that compare a voltage at an input 57 proportional to the value $\omega_A$ with a voltage at an input 58 proportional to the value $e_{R2}$. A voltage proportional in magnitude to the value $\omega_B$ is applied at a single input 59 to a function generator 60 that produces the output voltage $e_{R2}$. It will be noted that in this case, if multiple speeds are desired for the tape drive, corresponding changes are made in the circuit of the function generator 60, since in this case the function produced varies with the value $s$. However, the embodiment in FIG. 3 has an advantage over that of FIG. 2 that results from having a single input variable to the function generator 60, rather than two. Therefore, the generator 60 may be simpler in structure and less expensive than that of FIG. 2.

Figure 4:
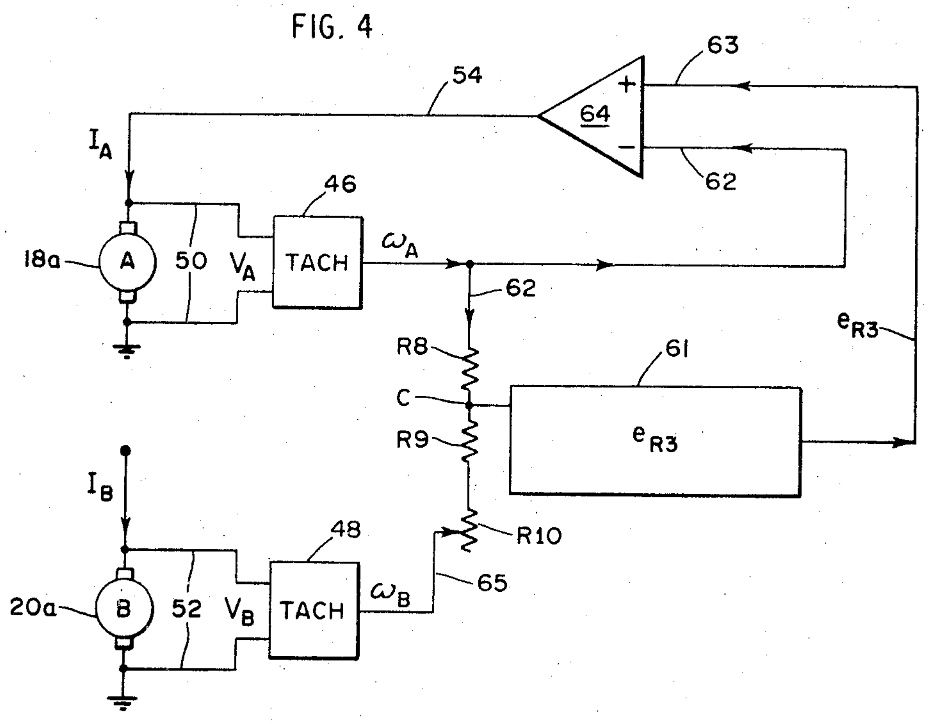
FIG. 4 is a block diagram illustrating a third embodiment of the invention, which is the preferred form.

FIG. 4 illustrates a third embodiment of the invention that has the same advantage as FIG. 3 but also a further advantage in that the input to the function generator does not undergo changes as large in slope as in the case of FIG. 3. Accordingly, the embodiment of FIG. 4 is the presently preferred form of the invention. This embodiment is based on equation (8), having comparison means 64 that compare a voltage at an input 62 proportional to the value $\omega_A$ with a voltage at an input 63 proportional to the value $e_{R3}$. Voltages proportional in magnitude to the values $\omega_A$ and $\omega_B$ on leads 62 and 65, respectively, are differenced and the difference is applied to a single input to the function generator 61, as described in detail below.

A convenient method of plotting graphically the function $e_{R3}$ is to compute values of $\omega_A$ corresponding to a number of assumed values of $\omega_B$ between the empty and full reel conditions using equation (7), then to compute the value $(\omega_A - \omega_B)$ for each of the corresponding values of $\omega_A$. The circuit 61 is constructed to produce the value $\omega_A$ from the value $(\omega_A - \omega_B)$. By this means, it can be readily demonstrated that the slope of the value $(\omega_A - \omega_B)$ does not experience as large changes as those that occur in the input 59 of FIG. 3.

Figure 5:
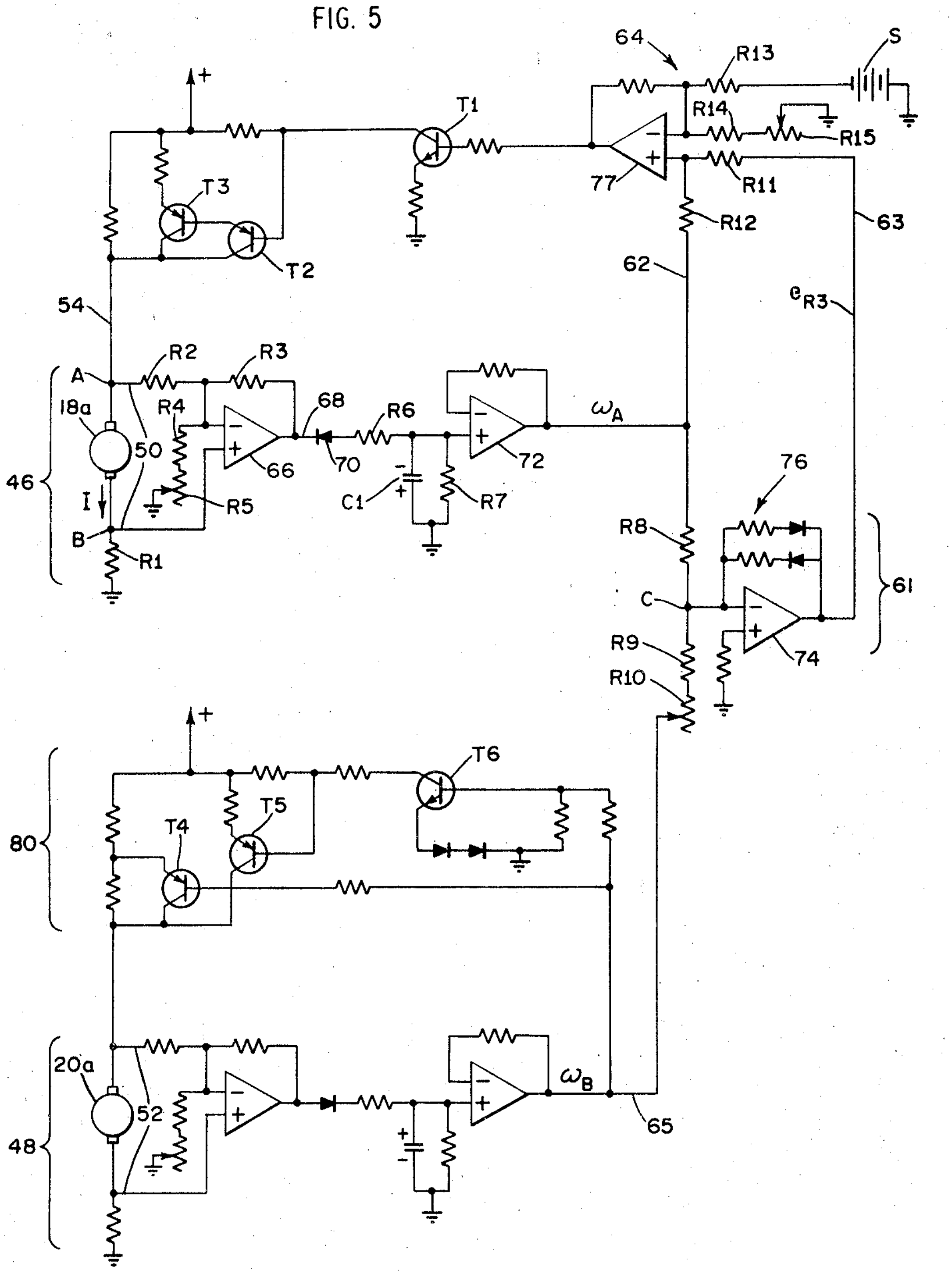
FIG. 5 is a schematic circuit diagram illustrating the embodiment of FIG. 4 in greater detail.

FIG. 5 is a schematic circuit diagram illustrating the embodiment of FIG. 4 in greater detail. In practice, the circuit is somewhat more complicated than that shown in FIG. 5 to accommodate additional circuits for stopping the tape, and for fast wind and rewind, but these circuits have been omitted for the sake of clarity of description.

Details of the tachometer circuits 46 and 48 are explained with reference to the circuit 46 shown in detail in FIG. 5, the circuit 48 preferably being identical thereto. As noted above, the voltage drop across the leads 50 connected across the armature 18a of the drive motor comprises two components. One component is the back E.M.F. induced in the armature winding as it turns in the magnetic field of the stator. This induced E.M.F. is proportional to the motor's speed and is zero when the motor is stalled. The second component is a voltage drop due to the current passing through the armature resistance. This I.R. drop is proportional to the current. The tachometer circuit is so designed as to produce at the output lead a voltage proportional to the first component only, and therefore provision is made, as described below, to cancel the I.R. drop. This is accomplished by means of a resistor R1 through which the armature 18a is connected to the circuit ground.

The characteristics of the drive motor 18 are such that the voltage across the armature connections 50 is given by the following expression.

$$V_{AB} = a\omega_A + bI_A, \qquad (9)$$

where $a$ and $b$ are constants, $b$ being equal to the armature resistance, and $I_A$ is the current through the armature. A standard high gain operational amplifier 66 having a feedback resistor R3 has an input connection through a resistor R2 to the point A and a second input connection to the point B. A resistor R4 and a series connected trimming resistor R5 are connected between an input connection and the circuit ground. With these connections, the output of the operational amplifier measured at a lead 68 can be expressed in the following form $$\text{output} = G_A V_A + G_B V_B, \qquad (10)$$

where $G_A$ and $G_T$are the gains with respect to the voltages at the points $A$ and $B$, respectively, and the voltages $V_A$ and $V_B$ are the voltages at the points $A$ and $B$ with respect to the circuit ground. The characteristics of the amplifier with respect to gain and the value of the resistor R1 are so chosen with respect to the constant $b$ (the internal resistance of the armature) that the following expression holds $$G_A/G_B = (-R1/R1 + b). \qquad (11)$$

For the case where $\omega_A$ is zero, this results in an output of zero as determined by equation (10). For the general case where the motor 18 is rotating, equation (10) takes the following form:

$$\text{Output} = (a\ R1\ G_B\ \omega_A/R1 + b), \qquad (12)$$

showing that the output is directly proportional to the value $\omega_A$.

In practice, the value of $b$ makes the second term on the right side of equation (9) large relative to the first term, and therefore careful balancing of the circuit is needed to eliminate its effect. The adjustable trimming resistor R5 in the tachometer circuit is provided to compensate for small differences in winding resistances, feedback resistor tolerances, and any other contributing factors.

Since the connections to the armature winding are made through a commutator, a suitable filter is provided at the output of the circuit described above. The filter preferably includes a germanium diode 70, resistors R6 and R7 and a condenser C1. The values of these elements are chosen to obtain sufficient pulse filtering as well as an adequate response time, to enable the tape to be accelerated from stop to forward speed in a short time interval.

The filtered signal is connected to a follower circuit 72 that has unity gain. The output of this circuit is connected to the lead 62. Similarly, the output of the tachometer circuit 48 proportional to $\omega_B$ is connected to the lead 65. However, the voltage on the lead 65 is positive with respect to ground, while the voltage on the lead 62 is negative with respect to ground.

The leads 62 and 65 are connected to a voltage differencing circuit including resistors R8, R9 and R10. The resistor R10 is for adjustment, whereby the potential at a point C is midway between the potentials on the leads 62 and 65.

The circuit 61 includes a conventional operational amplifier 74 and associated circuit elements including a diode-resistor feedback network 76, that synthesizes the function $e_{R3}$, and in practice the output is proportional to the theoretical value given by equation (8) within less than 3% error.

The output from the function generator 61 is connected with the comparison circuit 64 which includes an operational amplifier 77, the output of which is connected with a transistor T1. This transistor, a transistor T2 and a power transistor T3 convert the output to a proportional current suitable for feeding the drive motor armature 18a.

The operation of the above-described circuit can be further understood by considering the case in which equal amounts of tape are present on both reels so that the drive and drag motors are momentarily turning at equal speeds. In this case the leads 62 and 65 are equally below and above ground, respectively, so that the point C is at ground potential and the output of the generator 61 is also at ground potential. Resistors R11 and R12 are preferably of equal value, and therefore the potential difference between the lead 62 and ground is equally divided between them. Consequently the voltage at the associated input to the amplifier 77 is half the voltage at the lead 62. A voltage source S in conjunction with resistors R13, R14 and R15, applies an equal voltage to the other input to the amplifier 77 by suitable adjustment of the trimming resistor R15. Under these conditions the amplifier 77 is in balance and no change occurs in the current to the armature 18a.

If the speed of the motor 18 drops momentarily under the above-described conditions, the voltage at the output lead 62 of the tachometer 46 will momentarily become less negative, thereby causing the voltage at the associated input to the amplifier 77 to become more positive. This causes the transistors T1, T2 and T3 to conduct more heavily, sending increased current to the drive motor, thus overcoming the drop in speed.

Conversely, if the speed of the motor 18 momentarily increases above the correct value for the case where equal amounts of tape are present on both reels, the voltage at the lead 62 will momentarily become more negative, causing the voltage at the associated input to the amplifier 77 to become more negative, and thereby decreasing the current in the lead 54 to the armature of the motor.

When the drive motor 18 is initially started with all of the tape on the supply reel 14, the motor 18 rotates more rapidly than the drag motor 20. Under these conditions the voltage on the lead 65 is less positive than the voltage on the lead 62 is negative, and the resulting negative potential difference at the input to the amplifier 74 causes its output to be positive. If the drive motor 18 is rotating at the current speed, the voltage on the lead 62 is at a value to produce balance in the amplifier 77, the associated input to which is at the midpoint between the positive swinging output $e_{R3}$ and the negative-swinging voltage on the lead 62. As the tape continues to wind up on the take-up reel, the balanced condition is attained with progressively smaller positive and negative voltages at these points in the circuit.

A circuit designated generally at 80 controls the speed of the drag motor 20. Ideally, the current to the armature of the motor 20 is sufficient to maintain a substantially constant tension on the tape. For a constant tape tension the drag motor torque should be inversely proportional to the drag motor rotational speed. This may be seen by observing that $$\omega_B = (s/2\pi r_B), \text{ and} \qquad (13)$$

$$T = \text{torque}/r_B, \qquad (14)$$

where $T$ is the tension in the tape. These two equations yield the expression $$\text{torque} = (sT/2\pi\omega_B). \qquad (15)$$

The circuit 80 achieves the foregoing result be decreasing the drag motor current with increasing drag motor speed. The lead 65 is connected to a transistor T4 which is associated with transistors T5 and T6. As the speed of the drag motor 20 increases, the voltage at the lead 65 becomes more positive, thereby decreasing the current through the transistor T4. This decreases the current to the armature 20a.

It is not actually necessary that the tape tension be precisely constant at all times, but it is desirable to maintain a minimum tension on the tape. Therefore, other means may be provided if desired. In the described embodiment, the drive and drag motors are essentially identical, which makes possible a simple system for incorporating such features as rewind. To rewind the tape, it is only necessary to cause the current in the armature 20a to exceed that in the armature 18a. Preferably, the currents applied are controlled by suitable switches.

We claim:

1. Means to wind a strip at a constant linear speed on to a take-up reel from a supply reel, said means having, in combination, a variable speed drive motor having a rotor with means for rotating the take-up reel, energizing means for the drive motor responsive to a variable applied input signal to vary the speed of the drive motor in a direction to wind the strip on to the take-up reel, means restraining the supply reel to maintain tension on the strip, and means responsive to the angular speeds of both reels to vary the input signal to maintain substantially constant the ratio of the product of the squares of said speeds to the sum of said squares.

2. The combination according to claim 1, in which the means restraining the supply reel comprise a drag motor energized in a direction tending to wind the strip on to the supply reel.

3. The combination according to claim 2, including means to energize the drag motor variably.

4. The combination according to claim 3, in which the drive and drag motors are each adapted to develop increasing torque with increasing applied current, the current applied to the drag motor decreasing as the current applied to the drive motor increases.

5. The combination according to claim 1, in which the last-recited means include a tachometer for each of said reels, a function generator having an input connected with at least one of said tachometers, and a comparison circuit having an input connection with the function generator and an output connection with the drive motor.

6. The combination according to claim 5, in which the means restraining the supply reel comprise a drag motor.

7. The combination according to claim 6, in which the drive and drag motors each develop a counter E.M.F. varying with angular velocity and the tachometers comprise circuits responsive thereto.

8. The combination according to claim 5, in which both tachometers are connected with the function generator.

9. The combination according to claim 8, in which the comparison circuit compares the output of the function generator with a constant signal.

10. The combination according to claim 8, in which the function generator is responsive to the difference between the tachometer outputs and the comparison circuit compares the output of the function generator with the output of the drive motor tachometer.

11. The combination according to claim 5, in which the function generator has an input connected with one of said tachometers and the comparison circuit has one input connected with the function generator and a second input connected with the other of said tachometers.

12. The combination according to claim 9, in which the function generator generates a function approximately proportional to the ratio between the product of the angular velocities of the reels and the square root of the sum of the squares thereof.

13. The combination according to claim 11, in which the function generator generates a function of the output of one tachometer and of the linear velocity of the strip.

* * * * *